United States Patent
Li et al.

(10) Patent No.: US 7,242,717 B2
(45) Date of Patent: Jul. 10, 2007

(54) WAVELET DOMAIN MOTION COMPENSATION SYSTEM

(75) Inventors: Xin Li, Vancouver, WA (US); Louis J. Kerofsky, Portland, OR (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 560 days.

(21) Appl. No.: 09/877,463

(22) Filed: Jun. 8, 2001

(65) Prior Publication Data

US 2002/0186772 A1    Dec. 12, 2002

(51) Int. Cl.
*H04N 7/12* (2006.01)
*G06K 9/36* (2006.01)

(52) U.S. Cl. .................. 375/240.18; 382/248

(58) Field of Classification Search .......... 375/240.16, 375/240.18–240.2, 240.27; 348/402.1, 403.1, 348/413.1, 416.1, 425.2, 415.1, 699, 429.1; 382/236, 248, 107, 238
See application file for complete search history.

(56) References Cited

U.S. PATENT DOCUMENTS

| | | | | |
|---|---|---|---|---|
| 4,890,160 A | * | 12/1989 | Thomas .................... | 348/429.1 |
| 5,495,292 A | | 2/1996 | Zang et al. | |
| 5,740,283 A | * | 4/1998 | Meeker ...................... | 382/248 |
| 5,754,692 A | * | 5/1998 | Kondo et al. ................ | 382/216 |
| 5,790,206 A | * | 8/1998 | Ju ............................... | 348/699 |
| 5,815,602 A | * | 9/1998 | Ueda et al. ................. | 382/236 |
| 6,154,491 A | * | 11/2000 | Uetani .................... | 375/240.16 |
| 6,269,174 B1 | * | 7/2001 | Koba et al. ................ | 382/107 |
| 6,519,005 B2 | * | 2/2003 | Bakhmutsky et al. .... | 348/415.1 |
| 6,697,427 B1 | * | 2/2004 | Kurak et al. ........... | 375/240.03 |
| 7,023,922 B1 | * | 4/2006 | Xu et al. ................ | 375/240.19 |

OTHER PUBLICATIONS

Cote et al., H.263+: Video Coding at Low Bit Rates, IEEE Trans. on Circuits and Systems for Video Technology, vol. 8, pp. 849-866, Nov. 1998.

Jain et al., Displacement Measurement and Its Application in Interframe Image Coding, IEEE Trans. Communication, vol. COM-29, pp. 1799-1808, 1981.

Said et al., A New, Fast, and Efficient Image Codec Based on Set Partitioning in Hierarchical Trees, IEEE Trans on Circuits and Systems for Video Technology, vol. 6, No. 3, pp. 243-250, Jun. 1996.

Girod, Motion-Compensating Prediction with Fractional-PEL Accuracy, IEEE Transactions on Communication, vol. 41, No. 4, pp. 604-612, Apr. 1993.

Park et al., Motion Estimation Using Low-Band-Shift Method for Wavelet-Based Moving-Picture Coding, IEEE Transactions on Image Processing, vol. 9, No. 4, pp. 577-587, Apr. 2000.

Taubman et al., Multirate 3-D Subband Coding of Video, IEEE Transactions on Image Processing, vol. 3, No. 5, pp. 572-588, Sep. 1994.

(Continued)

*Primary Examiner*—Gims Philippe
(74) *Attorney, Agent, or Firm*—Chernoff, Vilhauer, McClung & Stenzel (57) ABSTRACT

Motion estimation for interframe coding of digital video is performed by matching blocks of transform coefficients representing a frame to be predicted with a phase-allocated array of coefficients representing a reference frame.

35 Claims, 7 Drawing Sheets

OTHER PUBLICATIONS

Yang et al., Scalable Wavelet Video Coding Using Aliasing-Reduced Hierarchical Motion Compensation, IEEE Transactions on Image Processing, vol. 9, No. 5, pp. 778-791, May 2000.

Mathew et al., Layered Coding Using Bitstream Decomposition with Drift Correction, IEEE Transactions on Circuits and Systems for Video Technology, vol. 7, No. 6, pp. 882-891, Dec. 1997.

Uz et al., Interpolative Multiresolution Coding of Advance Television with Compatible Subchannels, IEEE Transactions on Circuits and Systems for Video Technology, vol. 1, No. 1, pp. 86-99, Mar. 1991.

Naveen et al., Motion Compensated Multiresolution Transmission of High Definition Video, IEEE Transactions on Circuits and Systems for Video Technology, vol. 4, No. 1, pp. 29-40, Feb. 1994.

\* cited by examiner

WAVELET DOMAIN MOTION COMPENSATION SYSTEM

CROSS-REFERENCE TO RELATED APPLICATIONS

Not applicable.

BACKGROUND OF THE INVENTION

The present invention relates to digital video and, more particularly, to a motion compensation system for wavelet compressed digital video.

To make digital video transmission and storage practical the quantities of data required to describe the sequence of video frames must be reduced. Digital video compression is dominated by hybrid coding techniques where the data describing an image within a frame of the video sequence is typically transform coded and the images of certain frames are predicted from other frames of the sequence. Neighboring pixels of natural images tend to be highly correlated or spatially redundant. Transform coding decorrelates the image pixels facilitating a reduction in the spatial redundancy of the image data. In addition, there is often very little difference between the images in adjacent frames of the video sequence or substantial temporal redundancy in the sequence. Temporal redundancy is typically reduced by predicting the images in certain frames of the video sequence from the motion-compensated image of a reference frame. Interframe predictive coding generally comprises motion estimation to determine the displacement of image content between frames followed by motion compensation to isolate the part of the image content of a "current" frame that differs from that of the displaced image of the reference frame. Only the content differences or residual and the motion vectors describing the content displacement is coded, transmitted, and stored. At the decoder, the predicted ("current") frame is reconstructed by displacing the image content of the decoded reference frame as described by the motion vectors and adding the residual.

Block-based, transform coding has been used extensively for coding still images and for intraframe coding of video and is specified by a number of digital image coding standards. For example, block-based, transform coding utilizing the Discrete Cosine Transform (DCT) is the underlying mechanism of the JPEG (IS 10918) still image compression standard and the intraframe coding process of the MPEG-2 (ISO/IEC 13818) video compression standard. For block-based intraframe coding methods, the image is divided into a plurality of contiguous pixel blocks and the transformation method is applied to the pixels on a block-by-block basis.

For block-based video compression, the interframe motion of the image content is typically estimated by a block matching process. The compressed image is expanded in the encoder to reconstruct the image as it would appear at a decoder. A block of pixels (search block) from the current frame is isolated and compared to arrays of pixels of a reference frame in a search range around the spatial location of the search block in the current frame. The block of reference frame pixels that best matches the search block is typically determined by either a cross-correlation function or by minimization of an error criterion. When the block of pixels of the reference frame that best matches the search block is identified, a motion vector representing the motion of the pixels of the search block between its position in the current frame and the position of the best matching block in the reference frame is determined.

While block based compression underlies a number of successful still image and video compression standards, the process has limitations. Images compressed with block-based compression are vulnerable to compression artifacts, particularly at high compression ratios. The most common artifact is the blocking effect where the pixel blocks used for transformation are visible in the reconstructed image. In addition, the reception bandwidth of data processing networks, such as the Internet, is often heterogeneous. For example, one receiver may have a 10 Mbps. Ethernet connection to the network, another a 1.5 Mbps. T1 connection, and another a 54 Kbps. modem connection. In a network characterized by heterogeneous reception bandwidth, a scalable bitstream is highly desirable to enable the production of the highest quality images and video at each receiver of the system. However, block based compression is not well suited to encoding as a scalable bitstream. The desire for scalable transmission and higher quality images has motivated interest in wavelet transform based image compression methods.

Figure 1:
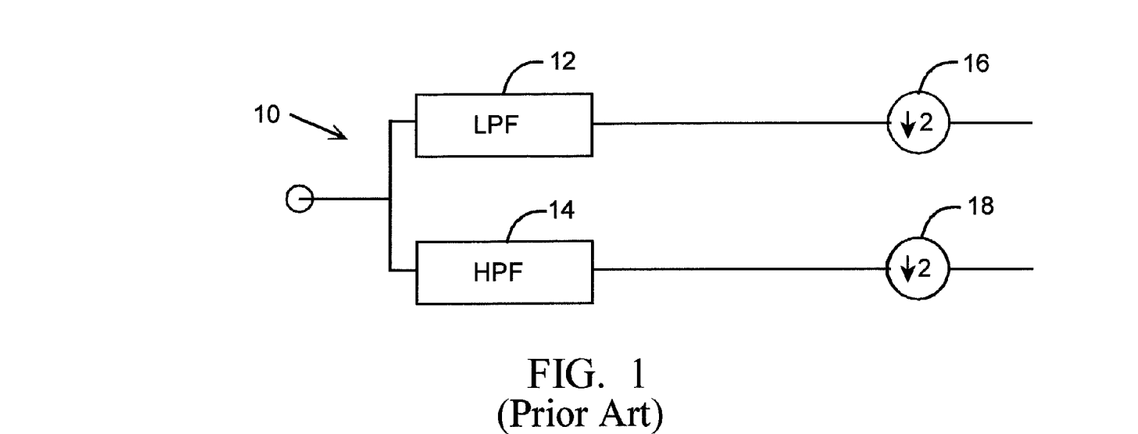
FIG. 1 is a block diagram of a one-dimensional wavelet transformation unit.

Wavelet transform based video compression is a hybrid compression technique that can produce a multi-resolution representation of the video frames that is well suited to a scalable transmission. Intraframe compression is accomplished by quantization of a set of wavelet transforms representing the rectangular array of pixels comprising an image. Typically, wavelet transformation is applied serially to each of the horizontal rows of pixels and then applied serially to each of the vertical columns of pixels making up the image. Referring to FIG. 1, a basic wavelet transformation unit 10 comprises generally a low-pass 12 and a high-pass 14 analysis filter and a down-sampler 16 and 18 for the output of each of the filters.

While wavelet-based image compression has a number of advantages over block-based image compression, it is not well suited to the use of the block matching technique for interframe motion estimation and compensation. If the image is reconstructed from the set of wavelet transform coefficients and block matching is performed on the pixels of the reconstructed image, the desirable scalable nature of the data stream is sacrificed and the coding efficiency is severely impacted because the reference frame, at full resolution, is required to decode the motion compensated predicted frame.

Figure 2:
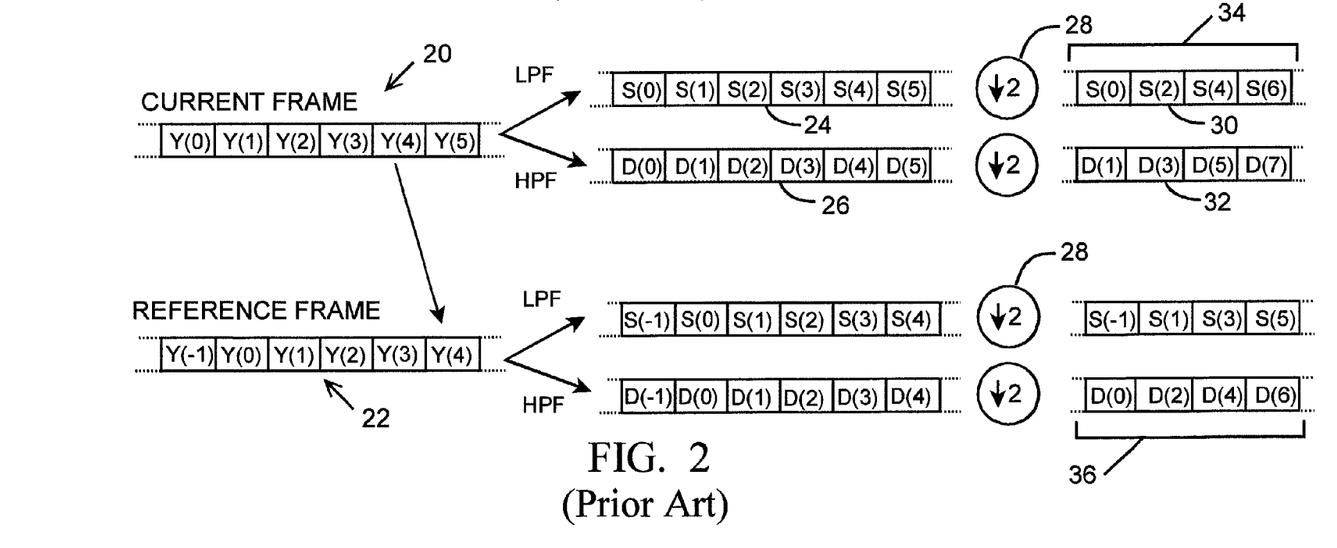
FIG. 2 is schematic representation of wavelet transformation of an exemplary row of pixels.

On the other hand, if block matching is applied to the set of wavelet transforms representing the image, the scalable nature of the compressed bit stream is preserved but phase uncertainty resulting from the wavelet transformation substantially reduces coding efficiency. FIG. 2 schematically illustrates the wavelet transformation of a horizontal row of pixels from a current frame 20 and a reference frame 22. The intensity of each pixel is represented as a function of the intensity (Y) for a pixel at an index location (0-5). For example, the intensities of the pixels Y(0) are the same in the current and reference frames. In fact, the pixels of the two rows 20 and 22 are identical, except that the pixels of the reference frame 22 are shifted one pixel or index position to the right of the corresponding pixel in the current frame 20. Following filtration by the low-pass 12 and high-pass 14 analysis filters of the transformation unit 10, the pixels of each row are represented by two sets of filter coefficients, a low-pass sub-band and a high-pass sub-band. For example, the row of pixels 20 of the current frame is represented by low-pass filter coefficients 24 and high-pass filter coefficients 26. The filter coefficients for the current and reference frames reflect the translation of pixels between the two frames. The wavelet transformation is completed by downsampling the filter coefficients 28. In the downsampling operation 28 every other filter coefficient is decimated. Typically, the odd-indexed coefficients of the low-pass subband 24 and the even-indexed coefficients of the high-pass sub-band 26 are decimated to create a complete set of low-pass 30 and high-pass 32 wavelet transform coefficients representing the pixels of the image. While the image can be reconstructed from the set of wavelet transform coefficients, the decimation of the filter coefficients creates a phase uncertainty in the sets of wavelet transform coefficients. As illustrated in FIG. 2, translation of image pixels shifts the phase of the wavelet transform coefficients with the result that two sets of wavelet transform coefficients 34 and 36 (indicated by brackets) representing two nearly identical rows of pixels 20 and 22 include no common coefficients. The translation of the pixels of the two exemplary rows cannot be detected by matching blocks of corresponding transform coefficients. When applied to images, wavelet transform coding is applied to the horizontal rows and columns of image pixels producing phase uncertainty along each axis of the image. As a result, the accuracy of motion estimation and the interframe coding efficiency is substantially comprised when block matching is performed in the wavelet transform domain.

What is desired, therefore, is a motion estimation system that provides efficient interframe coding and preserves the scalable nature of wavelet transform coding when encoding digital video.

DETAILED DESCRIPTION OF THE INVENTION

Figure 3:
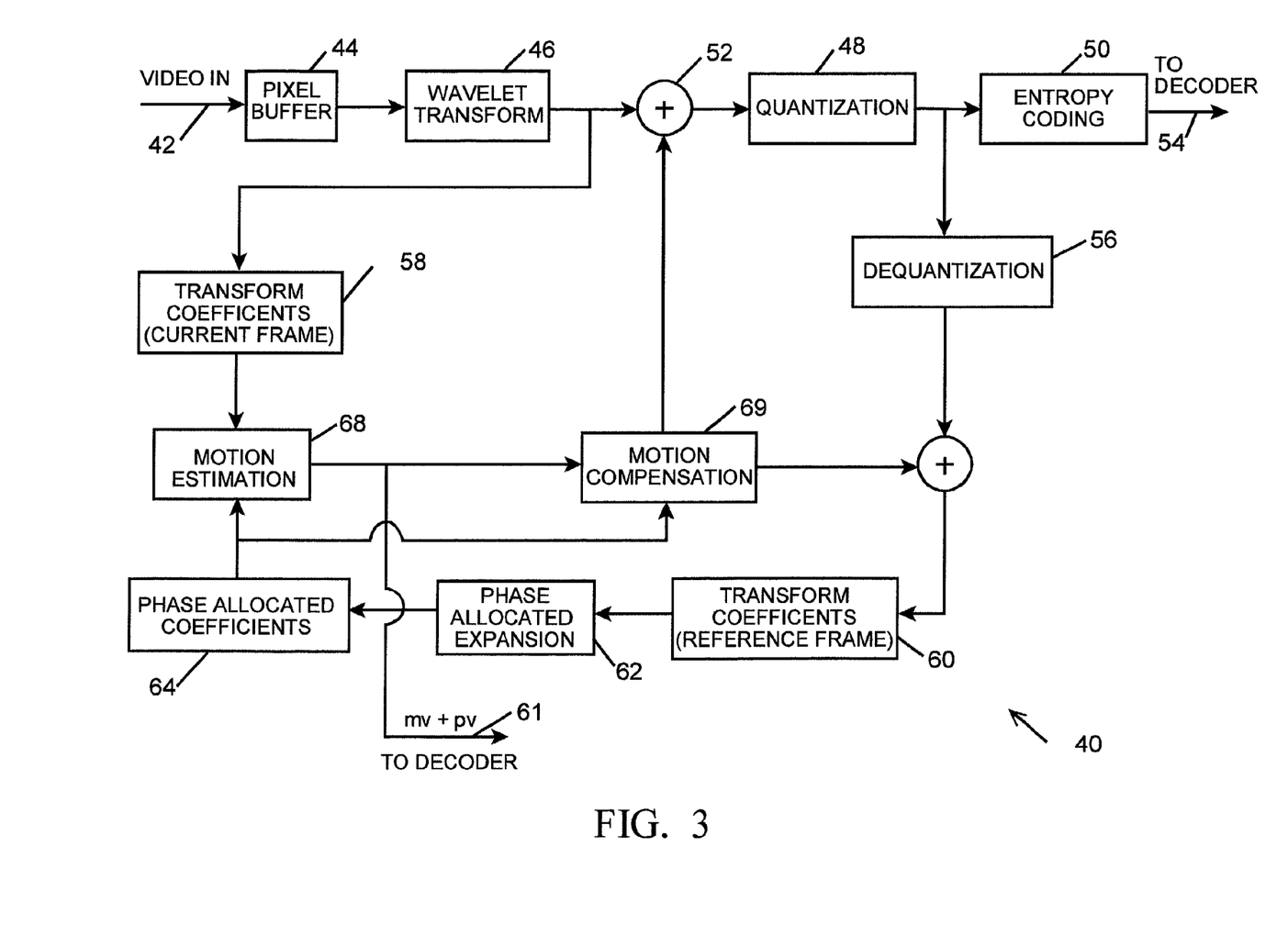
FIG. 3 is a block diagram of an exemplary wavelet-based video encoder.
Figure 4:
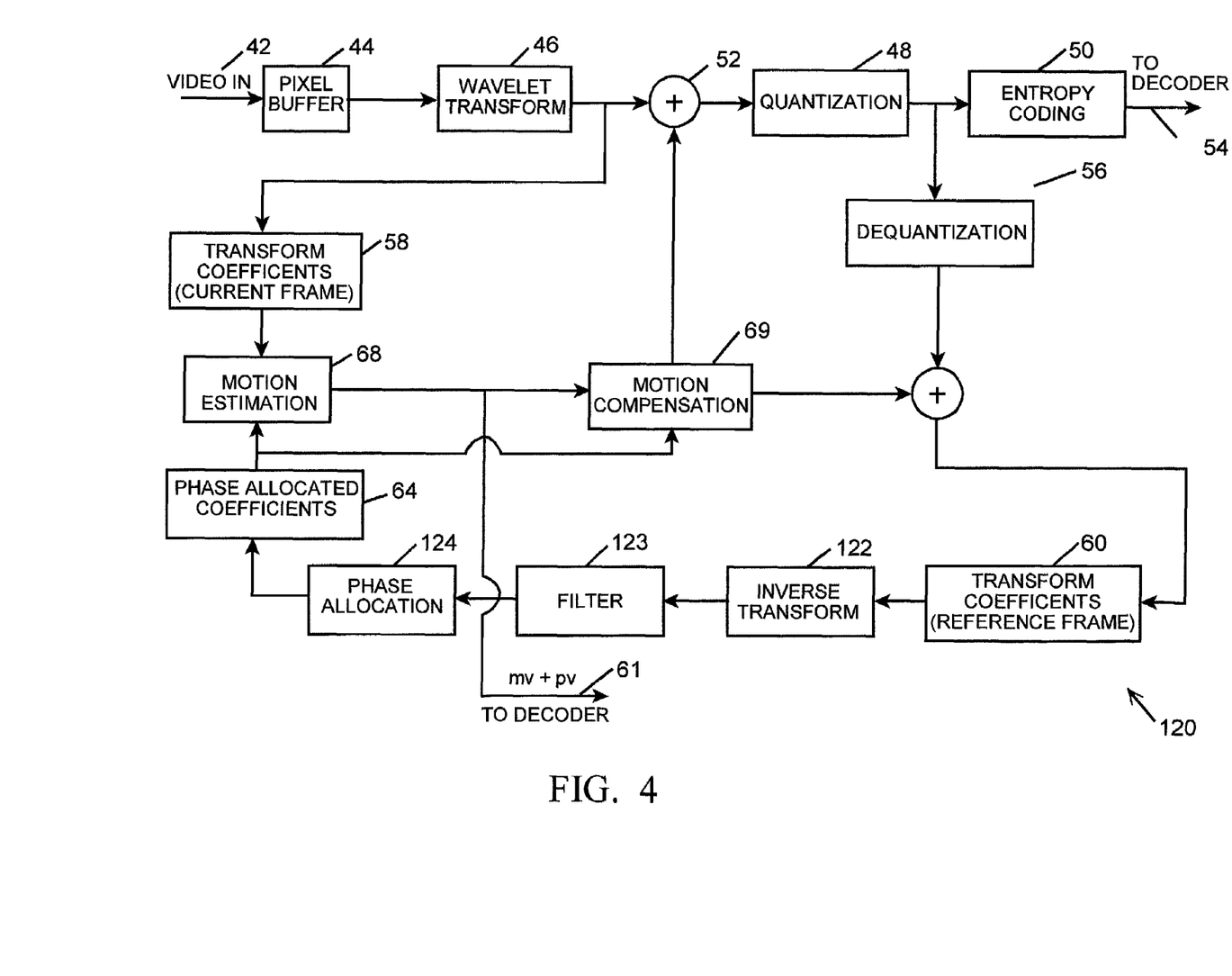
FIG. 4 is a block diagram of an exemplary wavelet-based video encoder of alternative construction.

Referring to FIGS. 3 and 4, a video sequence comprising a plurality of frames is compressed in video encoders 40 and 120. Generally, the encoders 40 and 120 are motion compensated, hybrid encoders that transform code the rectangular array of pixels of comprising an image in a video frame (intraframe coding) and apply motion estimation and compensation to isolate content differences between frames for more efficient interframe coding. Like numbered elements of the encoders 40 and 120 are functionally equivalent.

Figure 5:
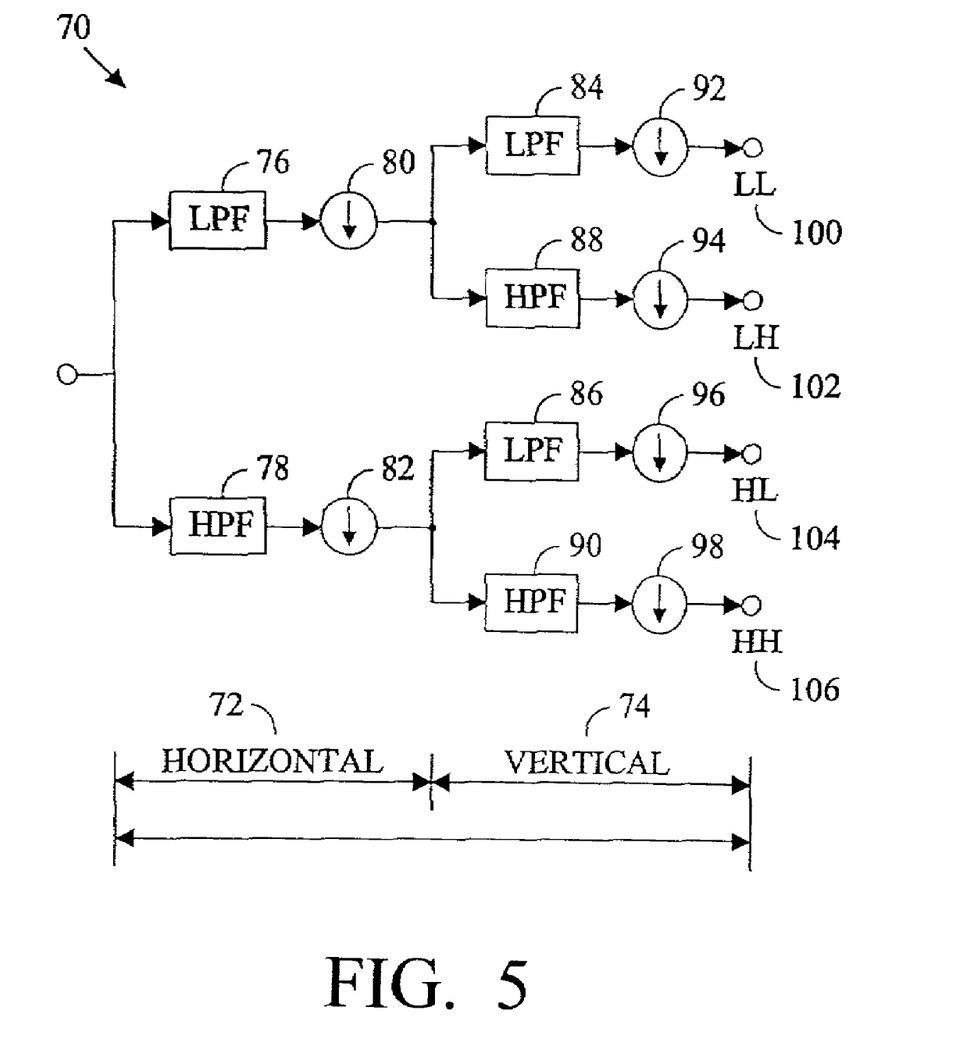
FIG. 5 is a block diagram of a wavelet transformation unit.

The pixels of the rectangular pixel array comprising a video frame 42 are input to the encoder from a pixel buffer 44. The signals representing the pixels are transformed in a wavelet transformation unit 46. Wavelet transformation comprises generally a filtering step followed by a down sampling step. Referring to FIG. 5, a wavelet transformation unit 70 generally comprises horizontal 72 and vertical 74 sections. The horizontal section 72 comprises a low-pass analysis filter element (LPF) 76 and a high-pass analysis filter element (HPF) 78 to separate and transform the input signal representing the intensities of pixels of a horizontal row of pixels into filter coefficients of a low-frequency sub-band and a high-frequency sub-band. The filter coefficients are input to down-sampling units 80 and 82 where every other filter coefficient is decimated. The vertical section 74 includes two pairs of low-pass (LPF) 84 and 86 and high-pass analysis filters (HPF) 88 and 90. One of the outputs of the horizontal section 72 is input to and analyzed by each pair of the vertical section analysis filters. A down sampling unit 92, 94, 96, or 98 is connected to the output of each of the vertical section 74 analysis filters. The downsampling units decimate every other transform coefficient output by the vertical section. The result of wavelet transformation is a representation of the rows and columns of image pixels with a plurality of filter coefficients that are regularly decimated to form a complete set of decimated coefficients or wavelet transform coefficients. Figuratively, the result of downsampling is a lattice of wavelet transform coefficients representing the pixels of the image. Wavelet transformation can be performed by computation or by the application of a lifting algorithm comprising the steps of splitting the original signal into odd and even sub-sequences, lifting, and normalization. Transformation by the transformation unit 70 converts the pixels of the image into four sub-bands of transform coefficients; designated LL 100, LH 102, HL 104, and HH 106 according to the order of application of the analysis filters.

Following transformation, the transform coefficients output by the wavelet transformation unit 46 are typically scanned in an order proceeding from the low frequency band to the high frequency band and quantized 48. Quantization indices, representing the transform coefficients of intraframe coded reference frames or the coded residual of predicted frames, are input to an entropy encoder 50 where they are typically coded by one or more lossless coding processes such as arithmetic coding, Huffman coding, and run length encoding. The coded, quantization indices are then output to a transmission or storage device for ultimate decoding 54.

The quantization indices are also input to an interframe coding portion of the encoders 40 and 120 where the motion of the image content between frames is estimated and the differences between a "current" frame and a motion compensated representation of the contents of a reference frame are established. The quantization indices are converted to quantized values in a dequantizer 56 to reconstruct the transform coefficients for the reference frame 60 with the values that the coefficients will have when decoded.

The present inventors realized that as a result of downsampling during wavelet transformation, translation of pixels between images produces a phase shift in the wavelet transform coefficients representing the compressed image. Referring again to FIG. 2, this phase shift is not detectable by block matching of the wavelet transforms and substantially reduces the accuracy of motion estimation and, as a consequence, the efficiency of predictive interframe coding. However, the present inventors also realized that since the downsampling operation decimates every other coefficient (either even or odd phase), the accuracy of motion estimation could be improved by resolving the phase uncertainty between the current and reference frames when estimating the motion of the content between the images in the two frames. With the phase uncertainty resolved, the motion of the image content could then be described as the combination of a motion vector indicating motion of a block of transform coefficients between frames and a phase vector resolving the phase uncertainty created by the wavelet transformation.

Figure 6:
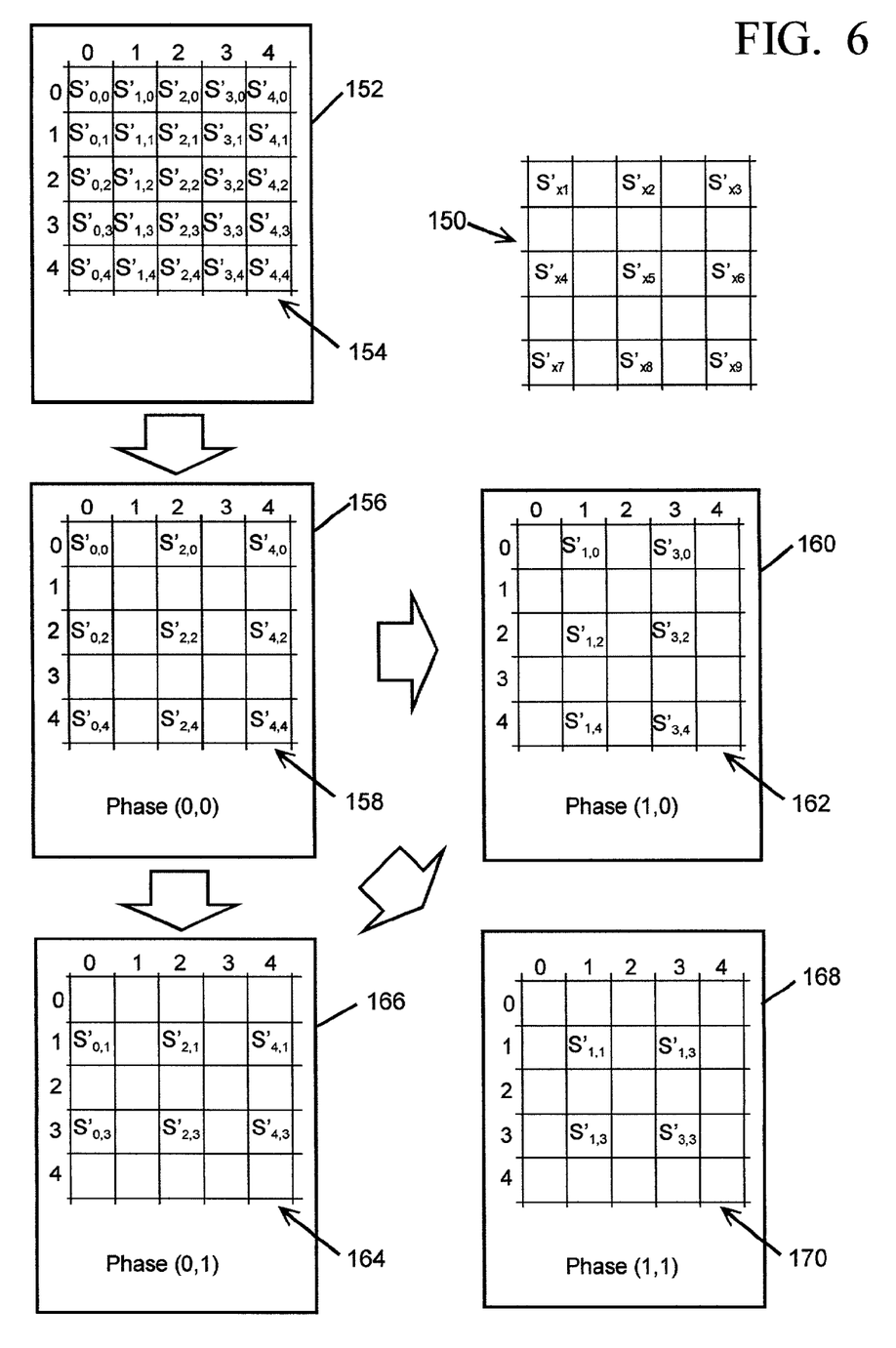
FIG. 6 is a schematic illustration of an overcomplete expansion of the compressed image.
Figure 7:
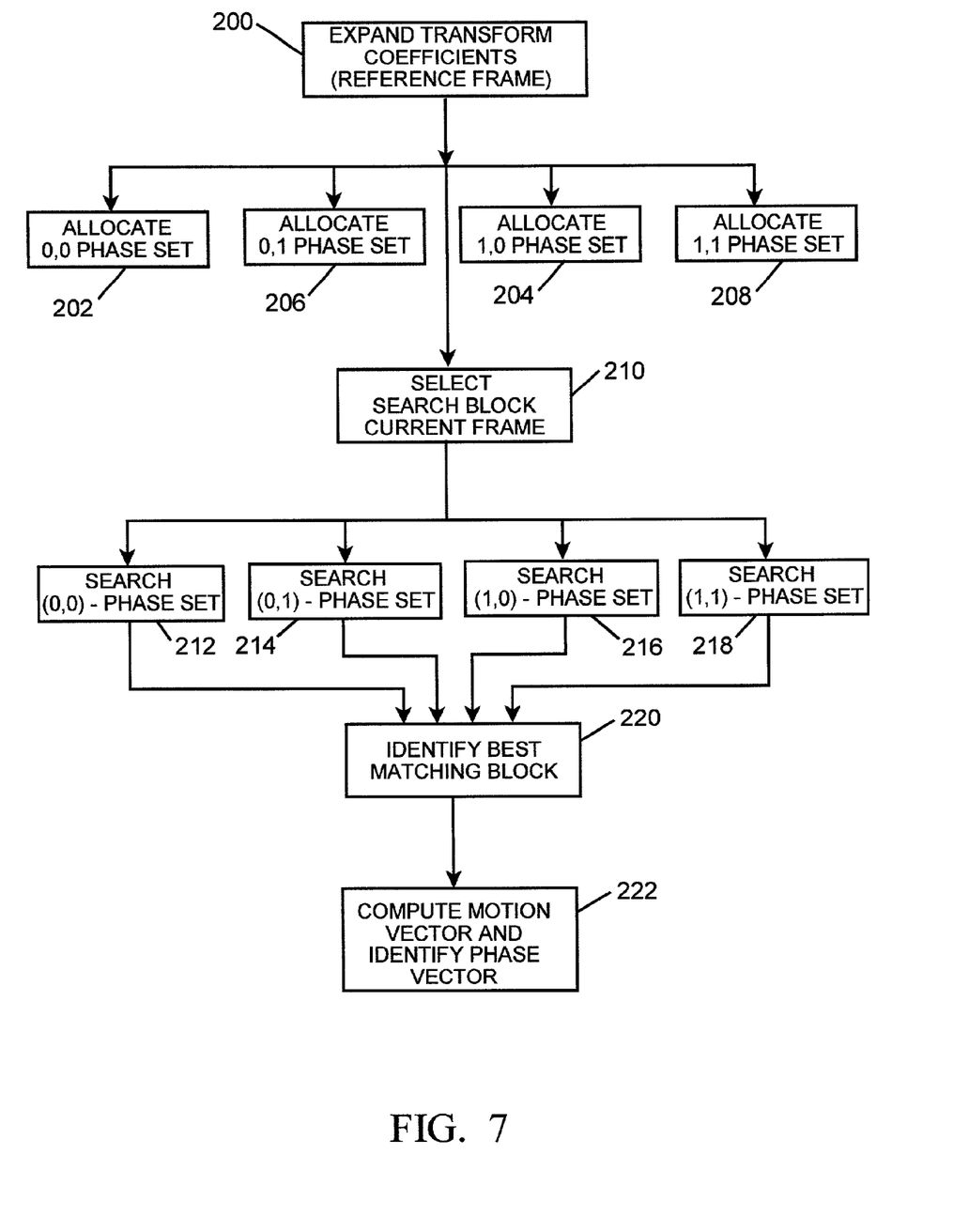
FIG. 7 is a flow diagram of the motion estimation method of the present invention.

Referring to FIG. 6, in the block matching method of the current invention, the motion of image content is determined by matching a block of transform coefficients from a current frame 150 with arrays of coefficients comprising a plurality of phase-allocated coefficient arrays representing phase-shifted versions of a reference frame. Referring to FIG. 7, in the method of the present invention, the filter coefficients of a reference frame, for example exemplary reference frame 150, are reconstructed by expanding the reconstructed, decimated wavelet transform coefficients 200. The reconstructed filter coefficients are allocated to a plurality of phase-allocated arrays or sets of coefficients 202, 204, 206, and 208. In the encoder 120, the transform coefficients 60 are inverse transformed to image pixels 122 which are filtered in an analysis filter unit 123 to obtain reconstructed filter coefficients. The filter coefficients are allocated to four phase-allocated coefficient sets 84 in a phase allocation unit 124. In the encoder 40, the transform coefficients 60 are partially expanded to filter coefficients and allocated to coefficient sets 64 in a phase-allocated expansion unit 62.

The phase-allocated sets of coefficients are created by appropriately decimating either odd or even indexed filter coefficients. The results are sets of coefficients shifted in phase relative to each other, simulating a translation of the pixels of rows and columns comprising the image. A (0, 0) phase-allocated coefficient set 156 is created by allocating even rows and columns of filter coefficients (equivalent to decimating odd rows and columns of coefficients) of the reference frame to the array 202. For example, reconstructed filter coefficients of the exemplary reference frame 152 include the coefficients of the rectangular array 154 which are decimated to produce the array of coefficients 158 included in the exemplary (0, 0) phase-allocated set 156. A (1, 0) phase-allocated coefficient set 160, including an array 162, is created by allocating 204 even rows and odd columns of filter coefficients from the reference frame 152. Since a phase shift in the transform domain corresponds to a translation of pixels in the image, the (1, 0) phase-allocated coefficient set 160 corresponds to shifting the pixels of the reconstructed image one pixel or index position in a direction congruent with the rows of pixels (horizontally to the right). Similarly, a (0, 1) phase-allocated coefficient set 166, including transform coefficient array 164, is created by allocating even rows and odd columns of coefficients to the set 206 to simulate a one index position pixel translation in a direction congruent to the columns of pixels (vertical). In the fourth, (1, 1) phase-allocated coefficient set 168 (including coefficient array 170) odd rows and odd columns of coefficients of the reference frame are allocated to the set 208 to simulate a one index position diagonal translation of the pixels of the image.

In the motion estimation unit 68 a search block (for example the coefficients of block 150) of transform coefficients of the current frame 58 is selected 210 and compared to arrays of coefficients in each of the phase allocated sets of coefficients 212, 214, 216, and 218. The comparison is performed in a search range around the spatial location of the search block in the current image. Block matching can be performed using known search algorithms including an exhaustive search, a 2-dimensional logarithmic search, and a conjugate direction search. The block of reference frame coefficients that best matches the search block from the current frame is typically determined by either maximizing a cross-correlation function or by minimization of an error criterion, such as the mean square error (MSE) or the minimum absolute difference (MAD). The best matching block of coefficients is identified 220 by comparing the results from the searches of the four phase-allocated sets of coefficients. The motion of the image content represented by the transform coefficients of the search block is determined by computing the motion vector describing the relationship of the search block's spatial location in the current frame and the spatial location of the best matching block of coefficients in the appropriate phase allocated set and by specifying a phase vector that identifies the phase allocated set in which the best matching block is located 222 and, therefore, resolves the phase uncertainty resulting from transformation.

The combination of the motion vector and the phase vector produces the phase compensated motion vector:

$$mv'=mv+pv$$

where: mv'=phase compensated motion vector mv=motion vector of a block of image content between the current frame and the best matching block of coefficients pv=phase vector of the phase-allocated coefficient set that includes the best matching block The phase compensated motion vector is transmitted to the decoder 61 for use in reconstructing the predicted frame of compressed video at the decoder and is input to the motion compensation unit 69 to produce a set of motion compensated reference frame transform coefficients that are subtracted 52 from the complete wavelet transform coefficient set of the current frame to identify the differing or residual content for predictive coding. The residual is quantized 48, entropy encoded 50, and transmitted 54.

Figure 8:
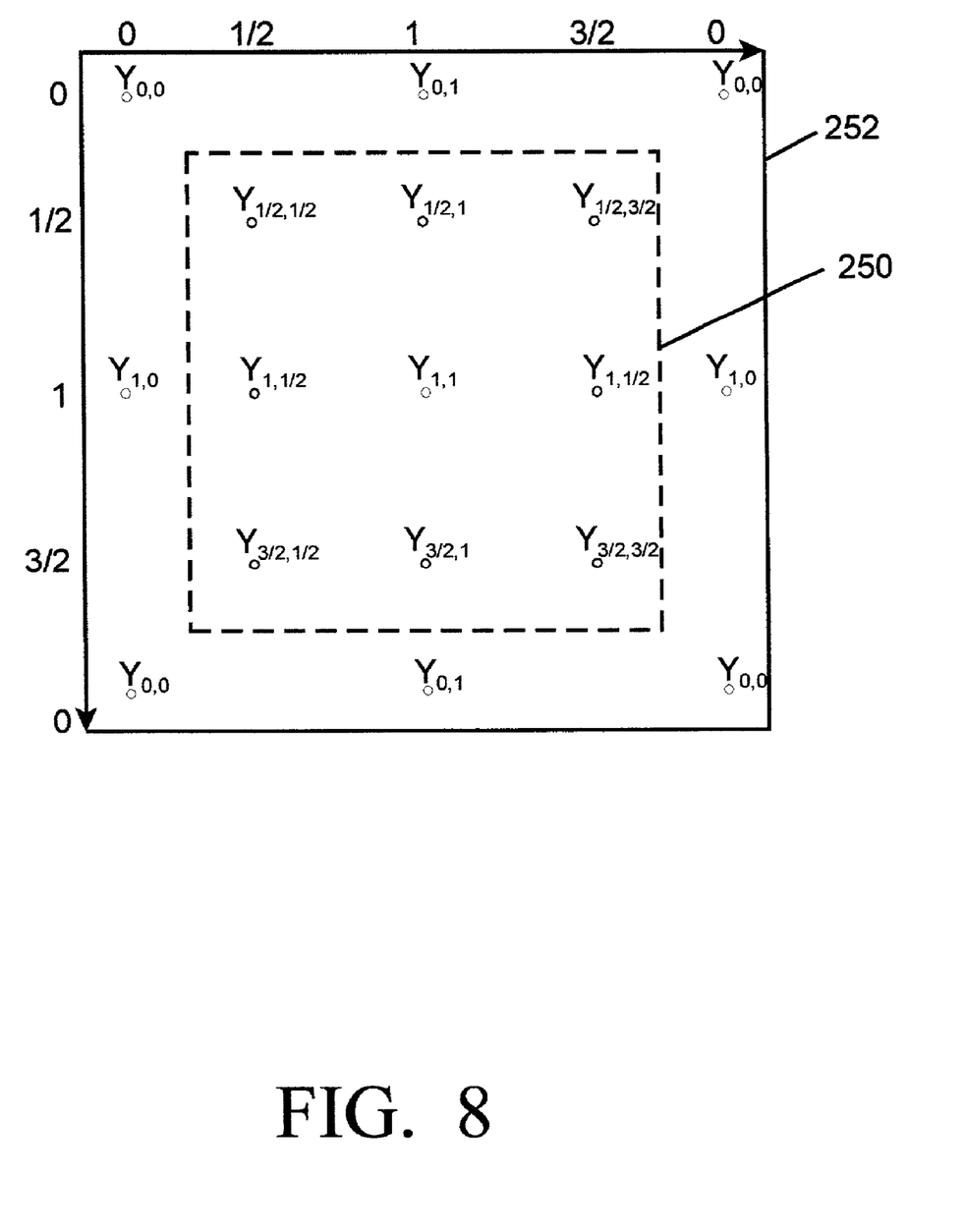
FIG. 8 is a schematic representation of motion estimation with fractional pixel resolution utilizing block matching at a fractional filter coefficient resolution.

The actual content displacement between frames may not be at integer pixel resolution and additional accuracy can be achieved by performing a block matching search at a fractional coefficient resolution. To reduce the computational complexity, best matching blocks can be identified with an integer coefficient search as described above. Referring to FIG. 8, the translations of pixels to locations between integer displacements are estimated by interpolating the results of the search of the phase-allocated coefficient sets. A search block 250 comprising coefficients of the current frame is then compared to the interpolated coefficients of the best matching block 222 of the appropriate phase-allocated set of reference frame coefficients to establish the motion vector with fraction pixel accuracy.

With the system of the present invention, the phase uncertainty resulting from downsampling during wavelet transformation is resolved. This permits accurate estimation of the displacement of the image content between frames for efficient interframe coding. In addition, motion estimation following transform coding retains the highly desirable scalable nature of the wavelet encoded bitstream.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of estimating a motion of a block of pixels between a first image and a second image of a sequence, said method comprising the steps of:
   (a) transforming said first and second images into a wavelet domain;
   (b) calculating a plurality of phase-allocated representations of the wavelet transformed said first image, each phase-shifted with respect to the other ones of said plurality of phase-allocated representations; and
   (c) identifying which of a plurality of said phase-allocated representations of said first image includes a block of wavelet transform coefficients best matching a block of wavelet transform coefficients representing said second image.

2. The method of claim 1 wherein the step of identifying which of a plurality of phase-allocated representations of said first image includes a block of coefficients best matching a block of coefficients representing said second image comprises the steps of:
   (a) comparing said block of coefficients representing said second image to a first array of coefficients representing said first image;
   (b) comparing said block of coefficients representing said second image to a second array of coefficients representing said first image, said coefficients of said second array allocated to shift a phase of said second array relative to a phase of said first array; and
   (c) identifying a block of coefficients of one said first and said second arrays maximizing a correlation relationship with said block of coefficients representing said second image.

3. The method of claim 1 wherein the step of identifying which of a plurality of phase-allocated representations of said first image includes a block of coefficients best matching a block of coefficients representing said second image comprises the steps of:
   (a) comparing said block of coefficients representing said second image to a first array of coefficients representing said first image;
   (b) comparing said block of coefficients representing said second image with a second array of coefficients representing said first image, said coefficients of said second array allocated to shift a phase of said second array relative to a phase of said first array; and
   (c) identifying a block of coefficients of one said first and said second arrays minimizing an error with said block of coefficients representing said second image.

4. The method of claim 3 wherein said error relationship comprises a mean square error relationship.

5. The method of claim 3 wherein said error relationship comprises an absolute difference relationship.

6. The method of claim 1 further comprising the steps of:
   (a) expanding a plurality of decimated wavelet transform coefficients representing said first image to create an expanded set of coefficients;
   (b) allocating a plurality of coefficients of said expanded set to create a first phase-allocated array of coefficients representing said first image; and
   (c) allocating a second plurality of coefficients of said expanded set to create a second phase-allocated array of coefficients representing said first image, said coefficients of said second plurality allocated to shift a phase of said second array relative to a phase of said first array.

7. The method of claim 6 wherein the step of identifying which of a plurality of phase-allocated representations of said first image includes a block of coefficients best matching a block of coefficients representing said second image comprises the steps of:
   (a) comparing said block of coefficients representing said second image to said first array of coefficients representing said first image;
   (b) comparing said block of coefficients representing said second image to said second array of coefficients representing said first image; and
   (c) identifying a block of coefficients of one said first and said second arrays maximizing a correlation relationship with said block of coefficients representing said second image.

8. The method of claim 6 wherein the step of identifying which of a plurality of phase-allocated representations of said first image includes a block of coefficients best matching a block of coefficients representing said second image comprises the steps of:
   (a) comparing said block of coefficients representing said second image to said first array of coefficients representing said first image;
   (b) comparing said block of coefficients representing said second image to said second array of coefficients representing said first image; and
   (c) identifying a block of coefficients of one said first and said second arrays minimizing an error with said block of coefficients representing said second image.

9. The method of claim 8 wherein said error relationship comprises a mean square error relationship.

10. The method of claim 8 wherein said error relationship comprises an absolute difference relationship.

11. The method of claim 1 further comprising the steps of:
    (a) transforming an array of pixels of said first image to a plurality of decimated coefficients;
    (b) expanding a plurality of said decimated coefficients to create an expanded set of coefficients;
    (c) allocating a plurality of coefficients of said expanded set to create a first phase-allocated array of coefficients representing said first image; and
    (d) allocating a second plurality of coefficients of said expanded set to create a second phase-allocated array of coefficients representing said first image, said coefficients of said second plurality allocated to shift a phase of said second array relative to a phase of said first array.

12. The method of claim 11 wherein the step of identifying which of a plurality of phase-allocated representations of said first image includes a block of coefficients best matching a block of coefficients representing said second image comprises the steps of:
    (a) comparing said block of coefficients representing said second image to said first array of coefficients representing said first image;
    (b) comparing said block of coefficients representing said second image to said second array of coefficients representing said first image; and
    (c) identifying a block of coefficients of one said first and said second arrays maximizing a correlation relationship with said block of coefficients representing said second image.

13. The method of claim 11 wherein the step of identifying which of a plurality of phase-allocated representations of said first image includes a block of coefficients best matching a block of coefficients representing said second image comprises the steps of:

(a) comparing said block of coefficients representing said second image to said first array of coefficients representing said first image;
(b) comparing said block of coefficients representing said second image to said second array of coefficients representing said first image; and
(c) identifying a block of coefficients of one said first and said second arrays minimizing an error with said block of coefficients representing said second image.

14. The method of claim 13 wherein said error relationship comprises a mean square error relationship.

15. The method of claim 13 wherein said error relationship comprises an absolute difference relationship.

16. The method of claim 1 further comprising the steps of:
(a) transforming an array of pixels of said first image to a plurality of decimated coefficients;
(b) expanding said plurality of decimated coefficients to reconstruct an array of pixels of representing said first image;
(c) filtering said reconstructed array of pixels to obtain an expanded set of coefficients;
(d) allocating a plurality of coefficients of said expanded set to create a first phase-allocated array of coefficients representing said first image; and
(e) allocating a second plurality of coefficients of said expanded set to create a second phase-allocated array of coefficients representing said first image, said coefficients of said second plurality allocated to shift a phase of said second array relative to a phase of said first array.

17. The method of claim 16 wherein the step of identifying which of a plurality of phase-allocated representations of said first image includes a block of coefficients best matching a block of coefficients representing said second image comprises the steps of:
(a) comparing said block of coefficients representing said second image to said first array of coefficients representing said first image;
(b) comparing said block of coefficients representing said second image to said second array of coefficients representing said first image; and
(c) identifying a block of coefficients of one said first and said second arrays maximizing a correlation relationship with said block of coefficients representing said second image.

18. The method of claim 17 further comprising the step of expressing said motion of said block of pixels as a relationship of a first vector specifying a phase-shift of said array that includes said coefficient block of maximum correlation and a second vector specifying a relationship of a spatial location of said block of coefficients in said second frame and a spatial location of said coefficient block of maximum correlation in said array that includes said coefficient block of maximum correlation.

19. The method of claim 17 wherein the step of identifying which of a plurality of phase-allocated representations of said first image includes a block of coefficients best matching a block of coefficients representing said second image comprises the steps of:
(a) comparing said block of coefficients representing said second image to said first array of coefficients representing said first image;
(b) comparing said block of coefficients representing said second image to said second array of coefficients representing said first image; and
(c) identifying a block of coefficients of one said first and said second arrays minimizing an error relationship with said block of coefficients representing said second image.

20. The method of claim 19 wherein said error relationship comprises a mean square error relationship.

21. The method of claim 19 wherein said error relationship comprises an absolute difference relationship.

22. The method of claim 19 further comprising the step of expressing said motion of said block of pixels as a relationship of a first vector specifying a phase-shift of said array that includes said coefficient block of minimum error and a second vector specifying a relationship of a spatial location of said block of coefficients in said second frame and a spatial location of said coefficient block of minimum error in said array that includes said coefficient block of minimum error.

23. A method of estimating a motion of a block of pixels between a first frame and a second frame of a video frame sequence, said method comprising the steps of:
(a) creating a first phase-allocated representation of said first frame using image pixel information only from said first frame, said first phase-allocated representation comprising a first plurality of wavelet transform coefficients representing a row and a column of an array of first frame pixels;
(b) creating a second phase-allocated representation of said first frame using image pixel information only from said first frame, said second phase-allocated representation comprising a second plurality of wavelet transform coefficients representing said first frame pixels, said second plurality of coefficients being allocated to simulate a displacement of said first frame pixels in a direction congruent of at least one of said row and said column of pixels relative to said first frame pixels as represented by said first phase-allocated representation;
(c) compressing a plurality of image pixels of said second frame to a plurality of second frame coefficients; and
(d) identifying which of said first phase-allocated representation and said second phase-allocated representation of said first frame includes a plurality of first or second coefficients, respectively, best matching a plurality of said second frame coefficients.

24. The method of claim 23 wherein the step of identifying which of said first phase-allocated representation and said second phase-allocated representation of said first frame includes a plurality of first or second coefficients, respectively, best matching a plurality of said second frame coefficients comprises the steps of:
(a) comparing said plurality of second frame coefficients to an array of coefficients of said first phase-allocated representation of said first frame;
(b) comparing said plurality of second frame coefficients to an array of coefficients of said second phase-allocated representation of said first frame; and
(c) identifying an array of said first frame coefficients maximizing a correlation relationship with said plurality of said second frame coefficients.

25. The method of claim 23 wherein the step of identifying which of said first phase-allocated representation and said second phase-allocated representation of said first frame includes a plurality of first or second coefficients, respectively, best matching a plurality of said second frame coefficients comprises the steps of:

(a) comparing said plurality of second frame coefficients to an array of coefficients of said first phase-allocated representation of said first frame;
(b) comparing said plurality of second frame coefficients to an array of coefficients of said second phase-allocated representation of said first frame; and
(c) identifying an array of said first frame coefficients minimizing an error relationship with said plurality of said second frame coefficients.

26. The method of claim 25 wherein said error relationship comprises a mean square error relationship.

27. The method of claim 25 wherein said error relationship comprises an absolute difference relationship.

28. The method of claim 23 further comprising the step of expressing said motion of said block of pixels as a relationship of a first vector specifying a phase-shift of said phase-allocated representation of said first frame that includes said plurality of coefficients best matching said plurality of second frame coefficients and a second vector specifying a relationship of a spatial location of said plurality of said second frame coefficients in said second frame and a spatial location of said best matching plurality of coefficients in said phase-allocated representation of said first frame that includes said plurality of best matching coefficients.

29. The method of claim 23 wherein the step of creating a first phase-allocated representation of said first frame comprising a first plurality of coefficients representing a row and a column of an array of first frame pixels comprises the steps of:
(a) transforming said first frame pixels to a decimated set of wavelet transform coefficients;
(b) upsampling said decimated transform coefficients to a set of filter coefficients representing said row and said column of first frame pixels; and
(c) including in said first phase-allocated representation of said first frame said filter coefficients representing said first frame pixels of a first row and a first column.

30. The method of claim 28 further comprising the step of creating said second phase-allocated representation of said first frame by including in said second representation said filter coefficients representing said first frame pixels of at least one of a row and a column pixels other than said first row and said first column.

31. The method of claim 23 wherein the step of creating a first phase-allocated representation of said first frame comprising a first plurality of coefficients representing a row and a column of an array of first frame pixels comprises the steps of:
(a) transforming said first frame pixels to a decimated set of wavelet transform coefficients;
(b) expanding said decimated set of transform coefficients to an array of reconstructed first frame pixels;
(c) filtering said array of reconstructed first frame pixels to create a set of filter coefficients representing said row and said column of first frame pixels; and
(d) including in said first phase-allocated representation of said first frame said filter coefficients representing a first row and a first column of said first frame pixels.

32. The method of claim 31 further comprising the step of creating said second phase-allocated representation of said first frame by including in said second phase-allocated representation filter coefficients representing said first frame pixels of at least one of a row and a column pixels other than said first row and said first column.

33. A video encoder comprising
(a) a phase-allocated expansion unit to expand a decimated array of wavelet transform coefficients representing a first frame of video to a plurality of phase-allocated sets of filter coefficients and using pixel information only from said first frame; and
(b) a motion estimation unit to identify which of said phase-allocated sets of filter coefficients includes a plurality of transform coefficients most closely matching a plurality of wavelet transform coefficients included in a second frame.

34. A video encoder comprising:
(a) an inverse transformation unit to expand a decimated array of wavelet transform coefficients representing a first video frame of video to an array of pixels of a reconstruction of said first video frame;
(b) a filter to transform said array of pixels of said reconstructed first video frame to an array of filter coefficients using pixel information only from said first frame; and
(c) a phase allocation unit to assign a plurality of said filter coefficients to each of more than two phase-allocated sets of coefficients using pixel information only from said first frame.

35. The encoder of claim 34 further comprising a motion estimation unit to identify a plurality of coefficients included in one of said phase-allocated sets of coefficients most closely matching a plurality of transform coefficients representing a plurality of pixels included in a second frame.

* * * * *